July 11, 1939.   E. M. PFAUSER   2,165,503
PORTABLE HYDRAULIC METAL STRAIGHTENING MACHINE
Filed Feb. 4, 1935
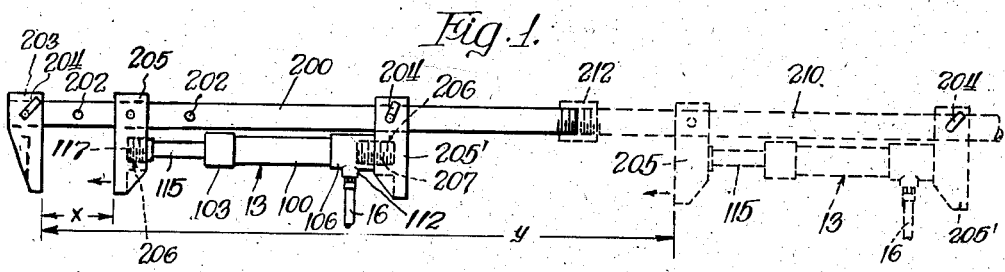
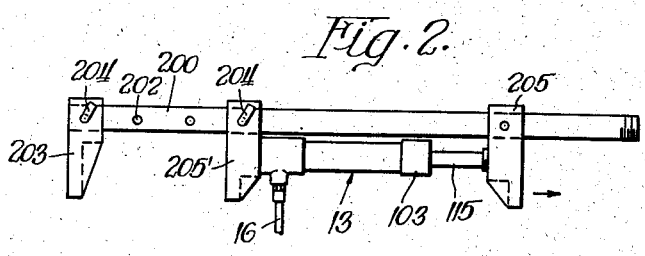
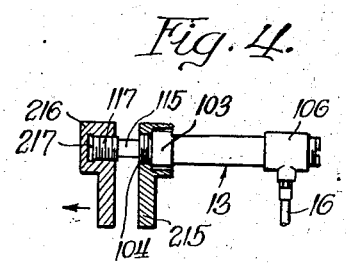
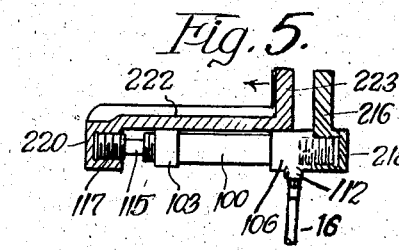
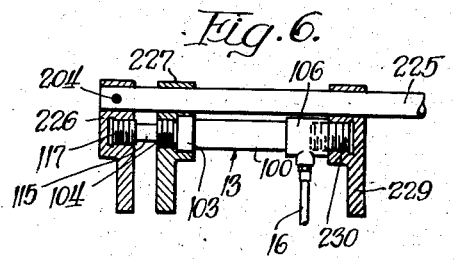
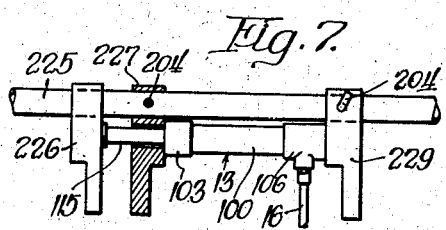
Inventor
Edward M. Pfauser
By Mason Jackson Gortcher & Drenner
Attys.

Patented July 11, 1939

2,165,503

UNITED STATES PATENT OFFICE 2,165,503

PORTABLE HYDRAULIC METAL STRAIGHTENING MACHINE

Edward M. Pfauser, Milwaukee, Wis., assignor to Blackhawk Mfg. Co., Milwaukee, Wis., a corporation of Wisconsin Application February 4, 1935, Serial No. 4,728

18 Claims. (Cl. 153—32)

My invention provides a portable hydraulic metal straightening machine. The machine of my invention is particularly applicable to automobile repair work. While it may be applied to other uses it finds a maximum utility in the straightening or reshaping of bent or deformed frames, bodies, fenders, etc., as well as the various incidental applications of force to various parts to force them apart or together, as the case may be.

There has been a demand of long standing for a machine applicable to the various operations involved in repairing automobiles damaged by collision or the like, which machine will provide for the ready and convenient application of a large degree of force, but under the most minute and accurate control. Such a device should be conveniently applicable to various straightening or bending operations. The operator should be able to observe the action of the device, even though the force must be applied at a point or from a position which is concealed from the view of the operator. That is to say, the operator should be able to stand at a position where he can observe the straightening effect, for example, sight along a beam or bar, or see the outside of a dented sheet metal part which is being straightened, while he is producing, or applying the necessary force. The machine should not require excessive exertion on the part of the operator.

Such a machine should be able to produce a pure straight line force in tension or compression, between parts to be pulled or pushed together or apart, and it should be able to do this no matter how narrow or how wide the spacing.

The machine should preferably be hand operated, for simplicity and low cost. Also, it should, if motor operated, be under most accurate and sensitive control.

The available force should be very great, and yet its application should be attended with no danger to the operator or to the work. To this end there should be no tendency, as in hand operated jacks employed in the prior art, to slip, due to the reaction of the force applied by the operator in actuating the device. That is to say, jacks, both mechanical and hydraulic, as now employed are dangerous and inconvenient to use, as the reaction of the leverage of the force applied by the operator tends to produce slippage of the jack with respect to the work. As a result many operations cannot be performed by pressure and resort must be had to hammering, which is frequently lacking in effectiveness, often inconvenient, and usually injurious to the part operated upon.

Such a machine should have the convenience of a tool, but provide the inherently guided and controlled action of a machine.

Such a machine should be readily applicable to various surfaces, areas, modes and directions of applying its effect. It should be able to act in confined places without diminution of effect or speed of operation. It should be able to work on close spacing or where parts are at considerable distance from each other, or from a support.

Such a machine should be able to produce and exert a high degree of force upon a part of the automobile to be straightened or forced into desired position, even though no stable base or foundation is available.

Such a machine should have no lost motion, or overthrow. There should be no yield in any of the parts. It should be light, strong, conveniently transportable to the work, and easily applicable to the particular operation to be performed. It should be capable of being conveniently operated by one man. It should comprise no heavy parts inconvenient to handle or to apply.

Such a machine should have the capability of performing numerous incidental operations, or general operations, along with the ability to perform its special work.

Such a machine should be inexpensive, so that it is available to small shop owners, and be widely available to the public.

Now it is the chief object of my invention to provide a machine which will fulfill the above and numerous other requirements.

The particular embodiment of my invention which I shall hereinafter describe in detail, fulfills all of the above requirements and secures, in addition, certain resultant advantages which indicate the marked advance in the art which it has produced.

The machine of my invention is of low cost. This enables a small shop to employ it as equipment and compete in quality and speed of output with larger shops more elaborately equipped, or able to purchase and employ more expensive equipment.

The speed of operation of the present device on a repair job is much greater than was ever possible with the most advanced equipment heretofore known. For example a job that under prior methods of repair i. e. with previously known equipment would take 20 man hours, was by the aid of my machine done in 7 man hours. This is reflected in lower cost to the public.

The quality of work done by my machine is superior to that done by the best of prior equipment. The accuracy of operation and the certainty with which accurate results are obtainable expedites and improves operations.

With the present machine it is possible to do certain straightening operations by pressure which previously could only be done by impact i. e. hammer blows. Now it is to be observed that most automobile collision repair work is no more than straightening out bent parts or unfolding thin metal parts that have been dented or wrinkled by collision or impact. I have found that most such parts can readily be bent back into their original shape or straightened. Where sheet metal parts are involved it is usually a case of pushing out dents or unfolding wrinkles. For this the slow powerful and accurately controlled motion produced by my machine is ideal.

Now in attaining the above objects and advantages and meeting the above demands I have provided an unusually simple and inexpensive but highly effective machine. In constructing my machine I have conceived as the central thought a simple hydraulic system involving a pump preferably manually operated or at least manually controlled, a small and light hydraulic ram of a size that can conveniently be carried in and placed by one hand employed as the force converting medium and a flexible connecting conduit of convenient length. The details of construction of the hydraulic system are set forth in my copending application, Serial No. 72,750, filed April 4, 1936, as a continuation in part of the present application which is particularly directed to the work engaging fittings and their relationship to the ram.

In a practical embodiment of my invention this central concept is elaborated in order to support certain desired capabilities, among others the following:

First, the machine must be applicable to all ordinary operations encountered in repairing a damaged automobile. This involves straightening out and reforming fenders, bodies, frames, running gear, motor parts and the like. Two distinct classes of operations are required to be performed, namely, first pushing, i. e., compression, and second, pulling, i. e., tension. For each there is the further requirement that there be two conditions met, namely, first, that a suitable engaging member, to move or shift or press upon the part or surface to be worked upon, be provided, and second, that a suitable engaging means, for firmly bearing upon and safely retaining engagement with whatever abutment or support is available, to take up the reaction of pushing or pulling, be provided. Also there is the requirement for quick and simple adjustment of the spacing of the operating parts, so that spacing requirements are easily met.

The machine, with its working appliances, is surprisingly compact when the wide variety of operations that can be performed by it are taken into account.

The machine is developed with a view to convenience of adaptability to various operations and conditions, and rapid change from one operation to another. When the machine is set up to perform one special operation it may quickly and conveniently be changed over to another set-up without the use of tools. Likewise, the various adjustments for different spacing may be made quickly, conveniently and positively.

Other objects and advantages of the present invention will appear more fully from the following detailed description, which, taken in conjunction with the accompanying drawing, will disclose to those skilled in the art the particular construction and operation of a preferred form of the present invention.

In the drawing:

Figure 1 is a side elevational view of an appliance for exerting a gathering or compressive force, with the ram unit built therein;

Figure 2 is a diagrammatic view showing the appliance set up with the ram therein and acting as a spreading device;

Figure 3 is a detail view of the locking pins shown in Figures 1 and 2;

Figure 4 is a modified form of a spreading appliance operating in a small space, with the ram itself serving as the guide;

Figure 5 shows a modified spreading appliance for heavy duty, also using the ram as a guide;

Figure 6 illustrates an appliance with external guide means and two jaws providing different spacings for spreading; and Figure 7 shows a modification of the use of the appliance shown in Figure 6;

Referring now to Figure 1, I have disclosed the ram unit 13 embodied in this figure for both short spacing and wide spacing compression of parts, or clamping thereof. This ram unit is supplied with fluid under pressure from any suitable source, such as a portable manually operable hydraulic pump unit, through the flexible pressure conduit 16. In this particular embodiment of the invention a suitable pipe length 200 is provided. This pipe length may be provided, at intervals therealong, with transverse openings 202 such as aligned drill holes. An adjustable end bracket or jaw 203 is suitably bored to fit over the pipe 200 and is provided with transverse registering openings through which a lock pin 204, shown in detail in Figure 3, may extend for locking the bracket 203 in fixed position with respect to the pipe 200. The pipe herein referred to is preferably extra heavy 1¼" pipe, carefully machined to uniform size, drilled, threaded and polished. A movable bracket or jaw 205 is slidably mounted and guided on the pipe 200. The bracket or jaw 205 is provided with a threaded socket 206, which socket is adapted to receive the threaded end 117 of the plunger 115 of the ram unit 13. Upon movement of the plunger 115 the jaw 205 is moved axially along the pipe 200, to cooperate with the adjustable jaw 203, to clamp members or spring members placed between the two jaws within the space indicated by the dimension X.

The ram unit 13 is held against rearward movement by means of the end bracket 205', which corresponds to the end bracket 205 carried by the plunger 115. The bracket 205' is locked to the pipe 200 by means of the pin 204 against axial and rotary movement. A nipple member, indicated at 207, connects the bracket 205' to the base 106 of the ram unit, the nipple 207 being threaded into the socket 206 of the bracket 205', and being also threaded into the opening 112 in the base 106 of the ram unit. It is therefore apparent, when pressure is applied to the ram cylinder 100 by the flexible hose 16 leading from the pump, that the plunger 115 will be moved outwardly with respect to the cylinder, moving the jaw or bracket 205 toward the fixed jaw or bracket 203. The movable jaw is thus guided in register with jaw 203 and bracket 205'. Thus, clamping of any suitable members, bending of members, drawing two spaced members toward each other, or other forming operations may be produced by such action.

If it is desired to provide for a wide spacing of the clamp, whereby two spaced frame members may be pulled toward each other, or for similar or analogous operations, an extension pipe connection 210 is provided, indicated in dotted lines in Figure 1. The extension pipe, indicated in dotted lines at 210, is coupled to the pipe 200 by means of the union 212. The bracket 205' is then pinned to the extension pipe 210 adjacent its outer end, and the ram unit 13 is secured thereto in the same manner. The sliding jaw 205 now has a much greater clamping spread, as indicated by the dimension Y. Thus, upon application of pressure to the ram 13, the plunger 115 moves the jaw 205 toward the union 212, serving to pull spaced frame members toward each other, or similar operations, as desired. It is, of course, to be understood that various lengths of pipes 200 and 210 may be employed or substituted, as desired, depending upon the desired spacing for the clamping jaws.

Where a spreading action is required, the arrangement shown in Figure 2 may be used. Generally, the same parts, as shown in Figure 1, are employed. However, the jaws 205 and 205' are reversed in position, the jaw 205' being secured to the pipe 200 by the pin 204 while the jaw 205 is movable to the right, as indicated. It will be understood that the members to be spread apart will be engaged by the jaw 205 and by either of the jaws 203 or 205' as the nature of the work may require. It will be noted that the jaw 203 is reversed from its position shown in Figure 1.

Referring to Figure 4, I have shown in this figure the use of the power unit for spreading members apart which have been crushed together, or for similar operations upon metal members. In this particular embodiment the ram unit 13 is provided with a jaw member 215 which is threaded to the cap or head 103 of the ram cylinder, being engaged over the threaded portion 104 of the cap. This fixes the position of the spreading jaw 215 with respect to the ram unit 13. A second jaw 216, having a threaded socket 217, is threaded upon the threaded end 117 of the plunger 115. Upon application of pressure to the ram the jaw 216 moves outwardly, away from the jaw 215, whereby it spreads any metal members which may be in contact with the opposite surfaces of the jaws 215 and 216. This spreading operation is usefully employed in connection with the pulling apart or bending of metal members which have been deformed toward each other, or in the straightening of any metal members or frame members which may be deformed and must be spread in this manner.

In Figure 5 I have shown a modified form of spreading jaws in which the jaw 216 is mounted through a suitable stud 218 or pipe nipple, which has its opposite end thereaded into the opening 112 in the end of the base 106 of the ram unit. This holds the jaw 216 in fixed position.

The plunger 115 carries, upon its threaded end 117, a spreading bracket 220, which is adapted to have a portion 222 overlying and guided on the outside of the ram unit. A jaw or bracket portion 223 projects laterally in register with the jaw 216, and it is moved by the plunger 115 away from the bracket or jaw 216 to produce a spreading action.

The spreading action produced may be employed for any purpose to which it is applicable, such as the bending of fenders or running boards away from the frame of a vehicle, the straightening of cross bracing members, or analogous operations in which such action is capable of being employed to produce the desired straightening of metal. The bending stress on plunger 115 is less in the set-up shown in Figure 5 than in Figure 4.

* In Figures 6 and 7 is disclosed the provision of a spreading action employed in connection with an extension pipe, forming a guide. In these figures an extension pipe 225 is adapted to carry thereon a fixed bracket member 226, shown in detail in Figure 6, keyed thereto by means of a suitable pin such as the pin 204. The member 226 has a threaded socket to receive the threaded end 117 of the plunger 115 of the ram unit 13. A bracket member 227 is adapted to have sliding engagement upon the pipe 225, and is carried in fixed position with respect to the ram unit 13 by means of a threaded opening adapted to be threaded over the extending portion 104 of the cap 103 of the ram member. The jaw 227 therefore moves as an integral part of the ram unit 13. At its opposite end the ram unit is provided with a second sliding jaw or bracket member 229, which member has sliding movement with respect to the pipe 225 and is secured to the base 106 of the ram unit by means of the nipple connection 230. Thus, upon application of pressure to the ram unit, the jaw 229 moves outwardly away from the fixed jaw 226 in register therewith, and thereby produces a spreading action between the surfaces of the jaw members 226 and 229. The threaded parts 104 and 117 are shown as of different diameters. They may be of the same pitch and diameter. So may the parts 104 and 230. Where the head 117 is smaller than part 104 it may be freely passed through an opening which threads upon part 104. If the parts are of the same diameter and pitch, the bracket 227, for example, must first be threaded past part 117 before it can be threaded upon part 104.

In the embodiment shown in Figure 7, the jaw or bracket member 229 is pinned to the pipe 225 by means of pin 204, and the jaw member 227 is likewise pinned to the pipe by means of a pin 204, and is thus held in fixed position with respect to the ram unit. The plunger 115 of the ram unit is adapted to carry on its end the jaw or bracket member 226 which, in this particular embodiment, is not keyed to the pipe 225. Therefore, upon application of pressure to the ram unit, the plunger 115 moves outwardly with respect to the jaws 227 and 229, moving the jaws 226 outwardly along the pipe 225 and producing a spreading action between either jaws 226 and 227 or jaws 226 and 229. Thus, various spacings between the jaw members and the ram unit may be provided, so that the ram unit may be employed for spreading purposes with practically any given spacing, to accommodate all ordinary conditions which might be encountered in work of this class.

While the invention has been particularly described in connection with automobile repair work, it is believed obvious that the particular features and distinct advantages secured by the machine of the present invention are equally applicable to other industrial uses, and provide a portable hydraulic metal straightening machine which is capable of use in any situation in which the utilities and capabilities provided thereby can be employed.

I do not intend to be limited to the details of the specific embodiment of my invention above described, except as they are essential to the law of the machine, and are recited in the appended claims.

I intend to protect the invention both broadly and specifically.

I claim:

1. In a portable metal straightening machine, the combination of a tubular guide having suitably spaced transverse holes, a plurality of tubular slides guided on said guide, said slides having laterally extending jaws, said slides having transverse holes adapted to register with said transverse holes in the guide, pins adapted to enter said holes for pinning one or more of the slides of the guide, said slides having coupling parts, a hydraulic ram unit having a cylinder and a piston, the cylinder and piston having coupling portions for cooperating with said coupling parts, one of said slides being secured to the end of said cylinder opposite the piston and movable along said guide upon extension of said piston, and a flexible hose for supplying hydraulic pressure to said ram unit.

2. In a portable metal straightening machine, the combination of a tubular guide having suitably spaced transverse holes, a plurality of tubular slides guided on said guide, said slides having laterally extending jaws, said slides having transverse holes adapted to register with said transverse holes in the guide, pins adapted to enter said holes for pinning one or more of the slides to the guide, said slides having threaded sockets, the axes of which are parallel to the axis of the tubular guide, a hydraulic ram having a cylinder and a piston, said cylinder having threaded coupling portions at opposite ends thereof for connection with said threaded sockets, and said piston having a threaded coupling portion at its outer extremity.

3. In a power unit of the class described, a pipe member, a plurality of brackets mounted on said member, one of said brackets being keyed thereto, a hydraulic ram cylinder disposed adjacent said pipe member and extending substantially parallel thereto, one end of said cylinder being secured to one of said brackets and the opposite end of said cylinder being secured to another of said brackets, a piston in said cylinder and extending therefrom, said bracket keyed to said pipe member being secured to the extending end of said piston, and means for applying pressure to said piston for moving one of said brackets axially along said pipe member away from the other of said brackets.

4. In a metal bending and straightening machine, a ram unit having a cylinder of generally tubular form and having an axially movable plunger projecting from one end thereof, a spreading bracket detachably coupled to the end of said plunger, a second bracket detachably coupled to the cylinder of said unit at said end thereof, the outer faces of said brackets being substantially parallel to each other to engage work to be spread apart, and means for supplying hydraulic pressure to said cylinder to move said plunger outwardly of said unit to separate said brackets.

5. In a metal bending and straightening machine, a ram unit of generally tubular form having an axially movable plunger, a spreading jaw detachably coupled to the end of said plunger, a threaded cap on said unit adjacent said end of said plunger, a second jaw threaded to said cap and having an opening through which said plunger extends, the outer faces of said jaws being substantially parallel to each other, to engage work to be spread apart, and means for applying pressure to said plunger to move the jaw on said plunger away from said second jaw.

6. In a power unit for engaging metal members, a ram unit of generally tubular form having an axially extensible plunger, a cylindrical guide member of a length greater than that of the ram unit, a jaw member slidable on said cylindrical guide member and secured to one end of said unit, a second jaw member secured to said plunger and keyed to said guide member, and a third jaw member carried by said unit and axially slidable along said guide member away from said second jaw member.

7. In a power unit of the class described, a ram unit comprising a ram cylinder and a ram plunger, coupling means at the outer end of said plunger, coupling means on opposite ends of said cylinder, a spreader jaw carried by each of said coupling means including a laterally offset portion, the work to be spread being engageable by the spreader jaw carried by said ram plunger and either of the spreader jaws carried by said ram cylinder.

8. In a metal bending and straightening machine, a ram unit including a cylinder and a plunger axially extensible from one end of said cylinder, coupling means on said one end of said cylinder and said plunger, and jaw members detachably secured to said coupling means, said one jaw member on said cylinder being apertured to provide free movement of said plunger therethrough.

9. In a portable metal bending and straightening machine, a hydraulic ram comprising a plunger and a cylinder therefor, jaw members, means on said plunger and cylinder for detachably securing said jaw members thereto, and a guide member having a length greater than that of said ram and extending parallel to said ram and engaging said jaw members, said ram plunger being fixed with respect to axial movement along said guide member.

10. In a power operated spreading device, a hydraulic ram unit comprising a cylinder and an axially extensible plunger projecting from one end thereof, means at opposite ends of said cylinder for selectively coupling a jaw member to either end thereof, means at the extending end of said plunger for coupling a second jaw member thereto, and means for applying pressure to the interior of said cylinder for extending the same to spread said jaw members.

11. A portable metal bending and straightening machine comprising, in combination, a tubular guide member, three jaw members having apertures therein of such diameter as to adapt them for slidable mounting on said guide member, means for locking at least one of said jaw members to said guide member, a hydraulic ram unit having a cylinder and a piston, and readily detachable coupling means for operatively connecting said cylinder and piston with two of said jaw members whereby, on application of hydraulic pressure to said ram, one of said jaw members is moved relative to the other two jaw members.

12. A portable metal bending and straightening machine comprising, in combination, a tubular guide member having a plurality of longitudinally spaced apart transverse apertures therein, three jaw members having apertures therein of such diameter as to adapt them for slidable mounting on said guide member and having transverse apertures therein for registering with said transverse apertures in said guide member, a plurality of pins for cooperating with said transverse apertures in said guide and jaw members for holding at least two of said jaw members immovable on said guide member, a hydraulic ram unit having a pair of oppositely movable members interposed between two of said jaw members, readily detachable means interconnecting at least one of said movable ram members and one of said last named two jaw members whereby, on application of hydraulic pressure to said ram, one of said jaw members is moved relative to the other two jaw members.

13. A portable metal bending and straightening machine comprising, in combination, a guide member, a first jaw member secured to said guide member, second and third jaw members arranged and adapted to be slidably carried by said guide member, means for selectively securing said second and third jaw members to said guide member, a hydraulic ram unit having a pair of oppositely movable members, and readily detachable coupling means for operatively connecting said movable ram members with said second and third jaw members whereby, on application of hydraulic pressure to said ram, one of them is moved along said guide member relative to the other and to said first jaw member.

14. A portable metal bending and straightening machine comprising, in combination, a hollow guide member adapted to withstand both tensile and compressive stress, a first jaw member secured to said guide member, second and third jaw members arranged and adapted to be slidably carried by said guide member, means for selectively locking said second and third jaw members to said guide member, a hydraulic ram unit having a cylinder and a piston, and readily detachable coupling means for operatively connecting said cylinder and piston with said second and third jaw members whereby, on application of hydraulic pressure to said ram, one of them is moved relative to the other and to said first jaw member.

15. In a portable metal bending and straightening machine, in combination, a ram unit comprising a ram cylinder and a ram plunger axially extensible from one end of said cylinder, coupling means on said one end of said cylinder, and a work engaging member having a laterally offset portion detachably mounted on said coupling means and arranged and adapted to cooperate with said ram plunger for working metal engaged by the same.

16. In a portable metal bending and straightening machine, in combination, a ram unit comprising a ram cylinder and a ram plunger axially extensible from one end of said cylinder, coupling means on the outer end of said ram plunger and on said one end of said cylinder, a work engaging member detachably mounted on the coupling means on said ram plunger, and a work engaging member having a laterally offset portion detachably mounted on the coupling means on said ram cylinder and arranged and adapted to cooperate with said first mentioned work engaging member for working metal engaged by the same.

17. In a portable metal bending and straightening machine, in combination, a ram unit comprising a ram cylinder and a ram plunger axially extensible from one end of said cylinder, coupling means on the outer end of said ram plunger and on said one end of said cylinder, work engaging members detachably mounted on said coupling means and having laterally offset portions for engaging metal and working the same on movement of said ram plunger.

18. A ram unit for applying force to a member to be moved comprising, a ram cylinder, a plunger in said cylinder having a projecting stud portion, coupling means at the end of said cylinder nearer to said stud portion, means secured to said stud portion and to said coupling means for adapting said unit for engaging said member and a suitable abutment, and means for applying pressure to said plunger.

EDWARD M. PFAUSER.